United States Patent Office  2,971,958
Patented Feb. 14, 1961

2,971,958
CYANOETHYLATED OXALACTAMS

John W. Lynn, Charleston, W. Va., assignor to Union Carbide Corporation, a corporation of New York No Drawing. Filed Mar. 17, 1959, Ser. No. 799,848

7 Claims. (Cl. 260—307)

This invention relates to novel cyanoethylated oxalactams as new compositions of matter, and to processes for their production. More particularly, this invention is concerned with N-(2-cyanoethyl)-oxazolidinone-4 compounds as new compositions of matter, and with processes for their production.

The novel cyanoethylated oxalactams of this invention can be graphically depicted by the formula

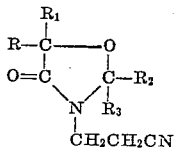

wherein R, $R_1$, $R_2$ and $R_3$ represent a hydrogen atom or a hydrocarbon radical, including alkyl radicals such as methyl, ethyl, propyl, isopropyl, butyl, isobutyl, pentyl, octadecyl and the like, cycloalkyl radicals such as cyclopropyl, cyclobutyl, cyclopentyl, cyclohexyl and the like, alkenyl radicals such as allyl, butenyl, pentenyl and the like, aryl radicals such as phenyl, naphthyl and the like, alkaryl radicals such as tolyl, xylyl, mesityl and the like, and aralkyl radicals such as benzyl, phenylethyl, phenylpropyl, diphenylmethyl and the like. Illustrative examples of the cyanoethylated oxalactams of this invention include N-(2-cyanoethyl)-2,5-diphenyloxazolidinone-4 which can be represented by the formula

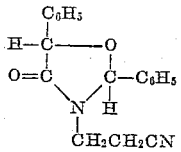

and N-(2-cyanoethyl)-2,2,5,5-tetramethyloxazolidinone-4 which can be represented by the formula

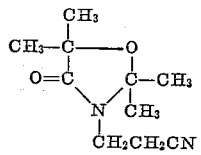

and such compounds as
N-(2-cyanoethyl)-2-methyloxazolidinone-4,
N-(2-cyanoethyl)-2-ethyl-5-cyclobutyloxazolidinone-4,
N-(2-cyanoethyl)-2-allyl-5-ethyloxazolidinone-4,
N-(2-cyanoethyl)-2-propyl-5-phenyloxazolidinone-4,
N-(2-cyanoethyl)-2-tolyl-5-allyloxazolidinone-4,
N-(2-cyanoethyl)-2-phenylethyl-5-methyloxazolidinone-4,
N-(2-cyanoethyl)-2,5-dimethyloxazolidinone-4,
N-(2-cyanoethyl)-2,5-diallyl-2,5-dimethyloxazolidinone-4,
N-(2-cyanoethyl)-2-propyl-5-phenyloxazolidinone-4,
N-(2-cyanoethyl)-2-cyclobutyl-5-tolyloxazolidinone-4,
N-(2-cyanoethyl)-2,5-ditolyl-2,5-dimethyloxazolidinone-4
and the like.

The novel cyanoethylated oxalactams of this invention can be produced by forming a mixture of a ring-oxygenated lactam and acrylonitrile, and heating the mixture in the presence of a strongly alkaline catalyst at an elevated temperature to cause these starting materials to react to produce an N-(2-cyanoethyl)-oxazolidinone-4 compound.

The ring-oxygenated lactams which can be employed as starting materials in preparing the novel compounds of this invention can be graphically depicted by the formula

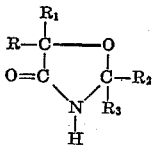

wherein R, $R_1$, $R_2$ and $R_3$ are as above defined. Illustrative of such starting materials are 2,5-diphenyloxazolidinone-4 which can be represented by the formula

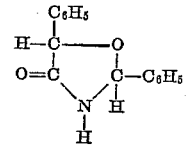

and 2,2,5,5-tetramethyloxazolidinone-4 which can be represented by the formula

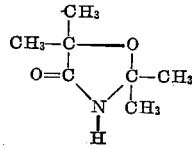

and such compounds as 2-methyloxazolidinone-4, 2-ethyl-5-cyclobutyloxazolidinone-4, 2-allyl-5-ethyloxazolidinone-4, 2-propyl-5-phenyloxazolidinone-4, 2-tolyl-5-allyloxazolidinone-4, 2-phenylethyl-5-methyloxazolidinone-4, 2,5-dimethyloxazolidinone-4, 2,5-diallyl-2,5-dimethyloxazolidinone-4, 2-propyl-5-phenyloxazolidinone-4, 2-cyclobutyl-5-tolyloxazolidinone-4, 2,5-ditolyl-2,5-dimethyloxazolidinone-4 and the like.

The ring-oxygenated lactams which can be employed as starting materials in preparing the novel compounds of this invention can by produced in various ways. By way of illustration, such compounds can be produced by the reaction of a cyanohydrin compound with an aldehyde or ketone. For example, 2,2,5,5-tetramethyloxazolidinone-4 can be produced by reacting acetone cyanohydrin and acetone in the presence of hydrogen chloride. This can be illustrated by the following graphic equation.

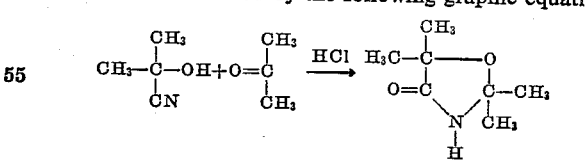

acetone         acetone         2,2,5,5-tetramethyl-
cyanohydrin                     oxazolidinone-4

By reacting similar cyanohydrin compounds having substituents other than methyl groups with similar ketones (or aldehydes) having substituents other than methyl groups in like manner it is possible to prepare a wide variety of compounds which can be employed as starting materials in preparing the cyanoethylated oxalactams of this invention.

An alternative method for producing ring-oxygenated lactams which can be employed as starting materials in preparing the novel compounds of this invention comprises heating a mixture of one or more cyanohydrin compounds and polyphosphoric acid at an elevated temperature to cause the cyanohydrin compounds present to react to produce the desired lactam. By way of illustration, 2,2,5,5-tetramethyloxazolidinone-4 can be produced by heating a mixture of acetone cyanohydrin and polyphosphoric acid at a temperature of about 85° C. This can be illustrated by the following graphic equation.

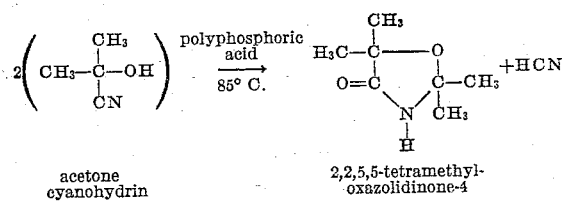

acetone cyanohydrin 2,2,5,5-tetramethyl-oxazolidinone-4

By reacting similar cyanohydrin compounds having substituents other than methyl groups in like manner it is possible to prepare a wide variety of compounds which can be employed as starting materials in preparing the cyanoethylated oxalactams of this invention.

The process of the instant invention comprises reacting acrylonitrile with a ring-oxygenated lactam in the presence of a strongly alkaline catalyst, and can be illustrated by the following graphic equation

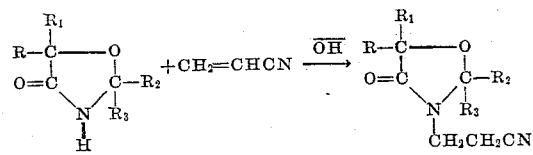

wherein R, $R_1$, $R_2$ and $R_3$ are as above defined. Thus, for example, N-(2-cyanoethyl)-2,5-diphenyloxazolidinone-4- can be prepared by the reaction of acrylonitrile with 2,5-diphenyloxazolidinone-4, and N-(2-cyanoethyl)-2,2,5,5-tetramethyloxazolidinone-4 can be prepared by the reaction of acrylonitrile with 2,2,5,5-tetramethyloxazolidinone-4.

When effecting reaction according to the process of the instant invention, it is preferable to employ an excess of acrylonitrile over the stoichiometric amount required to react with the ring-oxygenated lactam present in order to drive the reaction to completion. An amount of acrylonitrile ranging from the stoichiometric equivalent to a 4:1 mole ratio has been found effective for this purpose. Greater or lesser amounts of either reactant, for example amounts ranging from as little as 0.5 mole of acrylonitrile to as much as 10 moles of acrylonitrile per mole of ring-oxygenated lactam present, can also be employed; however, such proportions of reactants do not provide the advantages obtainable by operating within the narrower range indicated above.

The catalysts which are effective in promoting reaction between acrylonitrile and a ring-oxygenated lactam according to the process of the instant invention are strongly alkaline substances. Such catalysts include the oxides, hydroxides, cyanides, amides and alcoholates of the alkali or alkaline earth metals, as well as the alkali or alkaline earth metals themselves, and such strongly basic non-metallic hydroxides as the quaternary ammonium hydroxides. Specific examples of the catalysts which can be employed include sodium hydroxide, potassium hydroxide, lithium hydroxide, sodium oxide, sodamide, potasssium ethylate, sodium cyanide, potassium carbonate, potassium tertiary amylate, trimethylbenzylammonium hydroxide, benzyltriethylammonium hydroxide, and dimethyldibenzylammonium hydroxide.

The amount of catalyst employed in promoting reaction according to the process of the instant invention should be sufficient to impart a pH of at least 8 to the reaction mixture. Preferably, the pH of the reaction mixture should be maintained between 8 and 12, although any pH above 8 can be employed.

Reaction according to the process of the instant invention readily occurs at temperatures ranging from as low as 10° C. to as high as 100° C. Preferably, reaction is effected at temperatures ranging from about 30° C. to about 50° C. Temperatures both above and below the broadly disclosed range can also be employed; however, such temperatures do not provide the advantages obtainable by operating within the temperature range indicated above.

Atmospheric pressure is usually employed in effecting reaction according to the process of the instant invention. However, pressures both above and below atmospheric pressure, for example pressures ranging from as low as 400 mm. Hg to as high as 1000 p.s.i.g., can also be employed whenever it is desirable to do so.

The preparation of cyanoethylated oxalactams according to the process of the instant invention may be effected in an inert liquid solvent. By an "inert" liquid solvent is meant a liquid solvent in which the starting materials are soluble to an extent whereby they are brought into reactive contact and which itself is non-reactive under the conditions of the reaction. Suitable inert liquid solvents which can be employed for such purpose include hydrocarbons such as hexane, cyclohexane, heptane, benzene, toluene and the like, and ethers such as dioxane, tetrahydrofuran and the like. In general, an amount of solvent ranging from 0 to about 10 times, preferably from 0 to 5 times, the weight of reactants present can be effectively employed. Greater amounts of solvent can also be employed; however, such amounts of solvent do not provide the advantages obtainable by operating within the range indicated.

Reaction is preferably effected according to the process of the instant invention by dissolving the ring-oxygenated lactam in a suitable inert solvent, adding a strongly alkaline catalyst to the resulting solution in order to raise the pH thereof to at least 8, and then gradually and slowly adding acrylonitrile thereto with constant stirring. Preferably the reaction mixture is maintained at a temperature of from about 30° C. to about 50° C. both during the addition of acrylonitrile and for some time thereafter, for example for from 1 to 5 hours.

The cyanoethylated oxalactams of this invention are useful as insecticides and nematodicides, being particularly effective against red spider mites and vinegar eel nematodes.

The following examples illustrate the preparation of materials which can be employed in preparing cyanoethylated oxalactams in accordance with the process of the instant invention.

EXAMPLE I

Preparation of 2,5-diphenyloxazolidinone-4

To 318 grams of benzaldehyde (3 moles) was added a sufficient amount of a 50% solution of sodium hydroxide in water to impart thereto a pH of approximately 8. The mixture was maintained at a temperature of 10–20° C. by cooling while 90 grams of hydrogen cyanide (3.3 moles) were added over a 1 hour period. A 50% solution of sulfuric acid in water was then added to the mixture until the pH of the resulting mixture was lowered to approximately 4. The precipitate obtained by this procedure was then removed by filtration and the filtrate obtained thereby was dried over anhydrous sodium sulfate.

To the crude benzaldehyde cyanahydrin thus obtained was added a solution of 318 grams of benzaldehyde (3 moles) in 150 ml. of isopropyl ether. The resulting mixture was maintained at a temperature below 20° C. by cooling while anhydrous hydrogen chloride was sparged beneath the surface until the reaction mixture completely crystallized and no more hydrogen chloride was absorbed. About 715 grams of 2,5-diphenyloxazolidinone-4 were obtained in this manner. This represented a yield of about 99 percent of theoretical. This material had a melting point of 192–196° C.

EXAMPLE II

*Preparation of 2,2,5,5-tetramethyloxazolidinone-4*

An admixture of 85 grams of acetone cyanohydrin (1 mole) and 116 grams of acetone (2 moles) was prepared and maintained at a temperature of 20° C. by cooling while anhydrous hydrogen chloride was sparged beneath the surface until the reaction mixture was saturated. About 254 grams of a 21 percent solution of aqueous ammonium hydroxide was then added to the mixture with continued cooling, thereby causing the pH of the resulting mixture to rise to approximately 8. The voluminous, colorless precipitate obtained by this procedure was then removed by filtration. One hundred and sixteen (116) grams of 2,2,5,5-tetramethyloxazolidinone-4 were recovered in this manner. This represented a yield of about 81 percent of theoretical. This material had a melting point of 160–161° C.

The following examples of my invention are set forth for purposes of illustration so that those skilled in the art may better understand my invention, and it should be understood that they are not to be construed as limiting my invention in any manner.

EXAMPLE III

*Preparation of N-(2-cyanoethyl)-2,5-diphenyl-oxazolidinone-4*

To a mixture of 119.5 grams of 2,5-diphenyl-oxazolidinone-4 (0.5 mole) and 250 ml. of benzene was added a sufficient amount of a 50% solution of sodium hydroxide in water to impart thereto a pH of approximately 8. The mixture was maintained at a temperature of approximately 50° C. by heating while 106 grams of acrylonitrile (2 moles) were added over a one hour period. After the addition of acrylonitrile was complete, the mixture was heated at 55° C. for an additional hour. After cooling, sulfuric acid was added to the mixture until the pH of the resulting mixture was lowered to approximately 1. The precipitate obtained by this procedure was removed by filtration and the filtrate obtained thereby was stripped of solvent by heating under reduced pressure. About 80 grams of N-(2-cyanoethyl)-2,5-diphenyloxazolidinone-4 were recovered. This represented a yield of about 55 percent of theoretical.

*Analysis.*—Calcd. for $C_{18}H_{16}N_2O_2$: N, 9.6%. Found: N, 10.9%.

EXAMPLE IV

*Preparation of N-(2-cyanoethyl)-2,2,5,5-tetramethyloxazolidinone-4*

An admixture of 71.5 grams of 2,2,5,5-tetramethyl-oxazolidinone-4 (0.5 mole), 250 ml. of benzene, and 4 grams of a 50% solution of sodium hydroxide in water was prepared and maintained at a temperature of 50° C. by heating while 106 grams of acrylonitrile (2 moles) were added over a one hour period. After the addition of acrylonitrile was complete, the mixture was heated at 50° C. for an additional hour. After cooling, sulfuric acid was added to the mixture until the pH of the resulting mixture was lowered to approximately 6. The precipitate obtained by this procedure was removed by filtration and the filtrate obtained thereby was stripped of solvent by distillation under reduced pressure. About 106 grams of N-(2-cyanoethyl)-2,2,5,5-tetramethyl-oxazolidinone-4 were recovered. This represented a yield of 100 percent of theoretical. This material had the following properties: $n_D^{30°}$ 1.4567, d. 20/20 1.0461, and was identified by chemical analysis.

*Analysis.*—Calcd. for $C_{10}H_{16}N_2O_2$: C, 61.2%; H, 8.3%; N, 14.3%. Found: C, 61.4%; H, 8.1%; N, 14.6%.

EXAMPLE V

*Test of N-(2-cyanoethyl)-2,5-diphenyloxazolidinone-4 for nematocidal activity*

Into each of two petri dishes were placed three watch glasses, and 0.5 ml. of a water suspension of vinegar eel nematodes (*P. redivivus*) containing at least 25 organisms were added to each watch glass. To the centrally located watch glass in one of the two petri dishes was added 0.1 ml. of a 10 percent by weight solution of N-(2-cyanoethyl)-2,5-diphenyloxazolidinone-4 in petroleum ether, while to the centrally located watch glass in the other petri dish was added 0.1 ml. of petroleum ether alone. Both petri dishes were then covered and left undisturbed under controlled conditions of heat and humidity (80±2° F., 50±5% relative humidity) for 24 hours. At the end of this time, over 95 percent of the nematodes in the dish containing the N-(2-cyanoethyl)-2,5-diphenyl-oxazolidinone-4 had been killed, while all the nematodes in the dish containing only petroleum ether survived.

Unless otherwise specified, all parts and percentages, as used throughout this specification, are by weight.

What is claimed is:

1. N-(2-cyanoethyl)-2,5-diphenyloxazolidinone-4.
2. N-(2-cyanoethyl)-2,2,5,5-tetramethyloxazolidinone-4.
3. A process for producing N-(2-cyanoethyl)-2,5-diphenyloxazolidinone-4 which comprises forming a mixture of acrylonitrile, 2,5-diphenyloxazolidinone-4, and an inert liquid solvent, and heating the mixture in the presence of a strongly alkaline catalyst, said catalyst being present in an amount sufficient to impart a pH of at least 8 to the reaction mixture, at a temperature of from 10° C. to 100° C. to cause said acrylonitrile and said 2,5-diphenyloxazolidinone-4 to react to produce said N-(2-cyanoethyl)-2,5-diphenyloxazolidinone-4.
4. A process for producing N-(2-cyanoethyl)-2,2,5,5-tetramethyloxazolidinone-4 which comprises forming a mixture of acrylonitrile, 2,2,5,5-tetramethyloxazolidinone-4, and an inert liquid solvent, and heating the mixture in the presence of a strongly alkaline catalyst, said catalyst being present in an amount sufficient to impart a pH of at least 8 to the reaction mixture, at a temperature of from 10° C. to 100° C. to cause said acrylonitrile and said 2,2,5,5-tetramethyloxazolidinone-4 to react to produce said N-(2-cyanoethyl)-2,2,5,5-tetramethyloxazolidinone-4.
5. The cyanoethylated oxalactams represented by the general formula

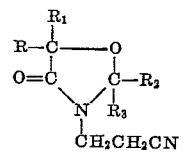

wherein R, $R_1$, $R_2$ and $R_3$ are radicals such that the cyanoethylated oxalactams are selected from the group consisting of N-(2-cyanoethyl)-2,5-diphenyloxazolidinone-4, N-(2-cyanoethyl)-2,2,5,5-tetramethyloxazolidinone-4, N-(2-cyanoethyl)-2-methyloxazolidinone-4, N-(2-cyanoethyl) - 2 - ethyl - 5 - cyclobutyloxazolidinone - 4, N - (2 - cyanoethyl) - 2 - allyl - 5 - ethyloxazolidinone-4, N - (2 - cyanoethyl) - 2 - propyl - 5 - phenyloxazolidinone - 4, N - (2 - cyanoethyl) - 2 - tolyl - 5 - allyl-oxazolidinone - 4, N - (2 - cyanoethyl) - 2 - phenyl-ethyl - 5 - methyloxazolidinone - 4, N - (2 - cyanoethyl)-2,5 - dimethyloxazolidinone - 4, N - (2 - cyanoethyl)-2,5 - diallyl - 2,5 - dimethyloxazolidone - 4, N - 2 - cyanoethyl) - 2 - propyl - 5 - phenyloxazolidinone - 4, N-

(2 - cyanoethyl) - 2 - cyclobutyl - 5 - tolyloxazolidinone-4, and N-(2-cyanoethyl)-2,5-ditolyl-2,5-dimethyloxazolidinone-4.

6. A process for producing cyanoethylated oxalactams represented by the general formula

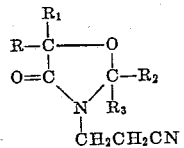

wherein R, $R_1$, $R_2$ and $R_3$ are radicals such that the cyanoethylated oxalactams are selected from the group consisting of N-(2-cyanoethyl)-2,5-diphenyloxazolidinone - 4, N - (2 - cyanoethyl) - 2,2,5,5 - tetramethyloxazolidinone - 4, N - (2 - cyanoethyl) - 2 - methyloxazolidinone - 4, N - (2 - cyanoethyl) - 2 - ethyl - 5 - cyclobutyloxazolidinone - 4, N - (2 - cyanoethyl) - 2 - allyl - 5 - ethyloxazolidinone - 4, N - (2 - cyanoethyl) - 2 - propyl - 5 - phenyloxazolidinone - 4, N - (2 - cyanoethyl) - 2 - tolyl - 5 - allyloxazolidinone - 4, N - (2 - cyanoethyl) - 2 - phenylethyl - 5 - methyloxazolidinone-4, N - (2 - cyanoethyl) - 2,5 - dimethyloxazolidinone - 4, N - (2 - cyanoethyl) - 2,5 - diallyl - 2,5 - dimethyloxazolidone - 4, N - (2 - cyanoethyl) - 2 - propyl - 5-phenyloxazolidinone - 4, N - (2 - cyanoethyl) - 2-cyclobutyl - 5 - tolyloxazolidinone - 4, and N - (2-cyanoethyl) - 2,5 - ditolyl - 2,5 - dimethyloxazolidinone-4; which comprises forming a mixture of acrylonitrile and a ring-oxygenated lactam selected from the group consisting of 2,5-diphenyloxazolidinone-4, 2,2,5,5-tetramethyloxazolidinone-4, 2-methyloxazolidinone-4, 2-ethyl-5-cyclobutyloxazolidinone-4, 2-allyl-5-ethyloxazolidinone-4, 2-proply-5-phenyloxazolidinone-4, 2-tolyl-5-allyloxazolidinone-4, 2-phenylethyl-5-methyloxazolidinone 4, 2,5-dimethyloxazolidinone-4, 2,5-diallyl-2,5-dimethyloxazolidinone - 4,2 - propyl - 5 - phenyloxazolidinone - 4, 2 - cyclobutyl - 5 - tolyloxazolidinone - 4, and 2,5-ditolyl-2,5-dimethyloxazolidinone-4, and heating the mixture in the presence of a strongly alkaline catalyst at an elevated temperature to cause said acrylonitrile and said ring-oxygenated lactam to react to produce said cyanoethylated oxalactams.

7. A process for producing cyanoethylated oxalactams represented by the general formula

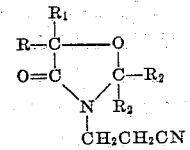

wherein R, $R_1$, $R_2$ and $R_3$ are radicals such that the cyanoethylated oxalactams are selected from the group consisting of N-(2-cyanoethyl)-2,5-diphenyloxazolidinone - 4, N - (2 - cyanoethyl) - 2,2,5,5 - tetramethyloxazolidinone - 4, N - (2 - cyanoethyl) - 2 - methyloxazolidinone - 4, N - (2 - cyanoethyl) - 2 - ethyl - 5-cyclobutyloxazolidinone - 4, N - (2 - cyanoethyl) - 2-allyl - 5 - ethyloxazolidinone - 4, N - (2 - cyanoethyl)-2 - propyl - 5 - phenyloxazolidinone - 4, N - (2 - cyanoethyl) - 2 - tolyl - 5 - allyloxazolidinone - 4, N - (2-cyanoethyl) - 2 - phenylethyl - 5 - methyloxazolidinone-4, N - (2 - cyanoethyl) - 2,5 - dimethyloxazolidinone-4, N - (2 - cyanoethyl) - 2,5 - diallyl - 2,5 - dimethyloxazolidinone - 4, N - (2 - cyanoethyl) - 2 - propyl - 5-phenyloxazolidinone - 4, N - (2 - cyanoethyl) - 2 - cyclobutyl - 5 - tolyloxazolidinone - 4, and N - (2 - cyanoethyl) - 2,5 - ditolyl - 2,5 - dimethyloxazolidinone - 4; which comprises forming a mixture of acrylonitrile and a ring-oxygenated lactam selected from the group consisting of 2,5-diphenyloxazolidinone-4, 2,2,5,5-tetramethyloxazolidinone - 4, 2 - methyloxazolidinone - 4, 2 - ethyl - 5 - cyclobutyloxazolidinone - 4, 2 - allyl - 5 - ethyloxazolidinone - 4, 2 - propyl - 5 - phenyloxazolididone - 4, 2 - tolyl - 5 - allyloxazolidinone - 4, 2 - phenylethyl - 5-methyloxazolidinone - 4, 2,5 - dimethyloxazolidinone-4, 2,5 - diallyl - 2,5 - dimethyloxazolidinone - 4, 2-propyl - 5 - phenyloxazolidinone - 4, 2 - cyclobutyl - 5-tolyloxazolidinone-4, and 2,5-ditolyl-2,5-dimethyloxazolidinone-4, and heating the mixtture in the presence of a strongly alkaline catalyst, said catalyst being present in an amount sufficient to impart a pH of at least 8 to the reaction mixture, at an elevated temperature to cause said acrylonitrile and said ring-oxygenated lactam to react to produce said cyanoethylated oxalactams.

No references cited.